(12) United States Patent
Bakhshi et al.

(10) Patent No.: US 7,379,670 B2
(45) Date of Patent: May 27, 2008

(54) METHOD AND APPARATUS FOR CHROMATIC DISPERSION COMPENSATION

(75) Inventors: Bamdad Bakhshi, New York, NY (US); Ekaterina A. Golovchenko, Colts Neck, NJ (US); Dmitriy I. Kovsh, Hoboken, NJ (US); Michael Vaa, Little Silver, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 623 days.

(21) Appl. No.: 10/103,390

(22) Filed: Mar. 21, 2002

(65) Prior Publication Data

US 2004/0208605 A1    Oct. 21, 2004

(51) Int. Cl.
H04J 14/02    (2006.01)
H04B 10/12    (2006.01)

(52) U.S. Cl. .......................... 398/81; 398/147

(58) Field of Classification Search .................. 398/81, 398/147–150, 183, 193, 208, 158, 192; 385/27, 385/123
See application file for complete search history.

(56) References Cited

U.S. PATENT DOCUMENTS

| | | | |
|---|---|---|---|
| 5,343,322 A | 8/1994 | Pirio et al. | 359/173 |
| 5,373,382 A | 12/1994 | Pirio et al. | 359/161 |
| 5,877,879 A * | 3/1999 | Naito | 398/91 |
| 6,330,381 B1 * | 12/2001 | Lu et al. | 385/24 |
| 6,559,988 B1 * | 5/2003 | Nielsen et al. | 398/82 |
| 6,583,907 B1 * | 6/2003 | Essiambre | 398/158 |
| 2003/0090766 A1 * | 5/2003 | Choudhary et al. | 359/181 |
| 2004/0028319 A1 * | 2/2004 | Ajgaonkar et al. | 385/16 |
| 2004/0125435 A1 * | 7/2004 | Liu et al. | 359/337 |
| 2004/0151512 A1 * | 8/2004 | Gill et al. | 398/183 |
| 2004/0184814 A1 * | 9/2004 | Ooi et al. | 398/147 |
| 2004/0208617 A1 * | 10/2004 | Essiambre et al. | 398/158 |
| 2004/0208648 A1 * | 10/2004 | Fishman et al. | 398/189 |
| 2004/0234272 A1 * | 11/2004 | Chowdhury et al. | 398/147 |

FOREIGN PATENT DOCUMENTS

| | | |
|---|---|---|
| FR | 2792139 | 10/2000 |
| WO | WO00/18047 | 3/2000 |

OTHER PUBLICATIONS

Bellotti et al., "Dependence of Self-Phase Modulation Impairments on Residual Dispersion in 10-Gb/s-Based Terrestrial Transmissions Using Standard Fiber", IEEE Photonics Technology Letters, vol. 11, No. 7, Jul. 1999.*

(Continued)

Primary Examiner—Shi K. Li
(74) Attorney, Agent, or Firm—Grossman, Tucker, Perreault & Pfleger, PLLC (57) ABSTRACT

A method and apparatus is provided for managing chromatic dispersion in an NRZ-based WDM long-haul optical transmission system so that nonlinearities are reduced, especially those at the edge channels of the band. The method includes using between 500 ps/nm and 2000 ps/nm of residual dispersion and a 40%/60% pre/post DCU split ratio when the channel wavelengths are shorter than the zero dispersion wavelength. Using these dispersion compensation rules, the nonlinear propagation effects in NRZ-based WDM systems is reduced, thus allowing for higher optical power per channel and/or longer transmission distances.

10 Claims, 6 Drawing Sheets

OTHER PUBLICATIONS

Bakhshi et al., "Comparison of CRZ, RZ and NRZ Modulation Formats in a 64×12.3 Gb/s WDM Transmission Experiment Over 9000 Km", OFC 2001, Mar. 21, 2001.*

S. Wen, "Bi-End Dispersion Compensation for Ultralong Optical Communication System", Journal of Lightwave Technology, vol. 17, No. 5, May 1999.*

S. Wen et al., "Ultralong Lightwave Systems with Incomplete Dispersion Compensations", Journal of Lightwave Technology, vol. 19, No. 4, Apr. 2001.*

A. Bertaina et al., "Experimental Investigation of Dispersion Management for an 8×10-Gb/s WDM Transmission System Over Nonzero Dispersion-Shifted Fiber", IEEE Photonics Technology Letters, vol. 11, No. 8, Aug. 1999.*

"Optical Networks: A Practical Perspective" by R. Ramaswami and K. Sivarajan, Academic Press, 1998, pp. 177-180.*

CA B. Bakhshi et al., "Comparison of CRZ, RZ and NRZ Modulation Formats in a 64×12.3 Gb/s WDM Transmission Experiment Over 9000 km", *OFC'2001*, 2001, paper WF4.

CB M. I. Hayee et al., "*NRZ* vs. *Rz* in 10-40 Gbit/s Dispersion-managed WDM Transmission Systems", *OFC'98*, 1998, paper FE2.

CC C. Fürst et al., "Comparison of Nonlinear Crosstalk for RZ and NRZ Coding in WDM Systems", *ECOC'2000*, 2000, vol. 33, pp. 193-194.

CD C. R. Davidson et al., "1800 Gb/s Transmission of One Hundred and Eighty 10 Gb/s WDM Channels Over 7,000 km Using the Full EDFA C-Band", *OFC'2000*, 2000, post-deadline paper PD25.

CE T. Tanaka et al., "2.1-Tbit/s WDM Transmission Over 7,221 km with 80-km Repeater Spacing", *ECOC'2000*, 2000, post-deadline paper 1.8.

CF E. Golovchenko et al., "Transmission Properties of Chirped Return-to-Zero Pulses and Nonlinear Intersymbol Interference in 10 Gb/s WDM Transmission", *OFC'2000*, 2000, paper FC3.

Zhu et al., "Experimental Investigation of Dispersion Maps for 40×10 Gb/s Transmission over 1600 km of Fiber with 100 km Spans Employing Distributed Raman Amplification", Mar. 17, 2001, *Trends in Optics and Photonics Series Tops*. vol. 54 (3 pgs).

Chbat et al., "Analysis of Link Architecture for Multiwavelength (N×10 Gbit/s) Transmission in Terrestrial Networks", 1996, *Institution of Electrical Engineers* (4 pgs).

European Search report dated Jul. 6, 2005 received in corresponding EPO application No. 03251463.0-2415 (5 pgs).

Japanese Office Action issued on Feb. 18, 2008 in Correpondence Japnanese Patent Application No. 2003/077039.

* cited by examiner

METHOD AND APPARATUS FOR CHROMATIC DISPERSION COMPENSATION

FIELD OF THE INVENTION

The present invention relates to an improved chromatic dispersion compensation method and apparatus. More particularly, the present invention relates to a dispersion compensation method and apparatus for long-haul wavelength division multiplexing (WDM) optical communication systems using Non-Return-to-Zero (NRZ) modulation techniques.

BACKGROUND OF THE INVENTION

Chromatic dispersion, or group-velocity dispersion, in optical communication systems is caused by a variation in the group velocity in a fiber with changes in optical frequency. This dispersion can cause pulse spreading in a lightwave signal, resulting in impaired system performance. Pulse spreading is especially troublesome in WDM transmission systems where two or more optical data carrying channels are combined onto a common path for transmission to a remote receiver.

When such a pulse, which may contain a spectrum of wavelengths, traverses the fiber, different wavelength components travel at different velocities. Thus, the pulse broadens as it travels down the fiber and by the time it reaches the receiver, it may have spread over several bit periods. This spreading may cause transmission errors. Furthermore, the wavelength dependence of chromatic dispersion is significant in long WDM systems because different wavelengths may need different dispersion compensation.

An NRZ modulation format is used to send binary information characterized by a light pulse that is rectangular and occupies the entire bit period. In contrast, in a Return-to-Zero (RZ) format, the light pulse occupies about half the bit period. The term NRZ describes the waveform's constant value characteristic when consecutive binary "ones" are sent. For example, if three binary "ones" are transmitted in a row, then the resulting waveform is a rectangle extending three entire bit periods, without returning back to zero.

The choice of the modulation format in WDM systems is a compromise between spectral efficiency and resistance against nonlinear propagation effects. The NRZ transmission format is particularly useful for transmitting large amounts of data over optically amplified fiber paths. As compared to Chirped-Return-to Zero (CRZ) (chirped RZ) or RZ, the NRZ modulation format is spectrally more efficient but is less resistant to nonlinearities. Consequently, known NRZ-based high-capacity WDM systems commonly operate at a low power per channel and usually over shorter distances to avoid these severe nonlinearities.

As NRZ-based systems provide a high degree of spectral efficiency, it would be desirable to decrease the nonlinear transmission penalties associated with NRZ format in long-haul WDM systems. This would allow systems to run at an increased power per channel and/or at longer distances.

Several known methods address the need for an NRZ-based WDM system with reduced nonlinearities. One group is known as pre-compensation (pre-launch compensation). Another group is known as post-compensation (compensation at the receiver terminal). Another known method of dispersion compensation is performed along the transmission line and known as dispersion mapping.

Dispersion mapping uses dispersion-shifted optical fiber as the preferred transmission medium. Through this technique, the zero dispersion wavelengths of the transmission fiber are offset from the operating wavelengths of the transmitter. The technique employs a series of amplifier sections having dispersion shifted fiber spans with either positive or negative dispersion. The dispersion accumulates over multiple fiber spans of approximately 500 to 1000 km. The fiber spans of either a positive or negative sign are followed by a dispersion-compensating fiber having dispersion of the opposite sign. This subsequent section of fiber is sufficient to reduce the average dispersion over the total length of the transmission system substantially to a zero.

The dispersion mapping technique is limited because the amount of dispersion that occurs in a typical optical fiber depends on the operating wavelength that is employed. This shortcoming may be overcome to a limited degree by using individual channel dispersion compensation at the receiver (post-compensation). However, because these systems are subject to nonlinear penalties, the ability to correct the non-zero dispersion at the receiver terminal is also limited.

Another approach is described in U.S. Pat. No. 6,137,604. In the '604 patent, a method and apparatus is provided wherein the usable optical bandwidth of the transmission system is divided into sub-bands that individually undergo dispersion compensation before being re-combined. In this way, more WDM data channels reside near a wavelength corresponding to the average zero dispersion wavelength. However, for NRZ-based WDM systems, nonlinearities are still somewhat troublesome and not completely reduced, especially near the edge channels of a given band.

A further approach compensates for the line dispersion in the terminal dispersion compensation units (DCUs). This results in a residual dispersion very close to zero. The residual dispersion is the sum of the total amount of dispersion compensation and the accumulated dispersion in the transmission line, including the dispersion sign. Again, nonlinearities still exist, which effect the amount of power per channel that can be used as well as the total length of the system.

The above methods have certain disadvantages. Although those techniques are sufficient in reducing nonlinearities, there is still a need for improvement, especially where a given NRZ-based WDM system has strong nonlinearities at edge channels of a given band. Here, the channels accumulate a large amount of dispersion along the transmission line. It would be desirable to reduce the amount of nonlinearities while having an increased optical power per channel and increased system distances.

SUMMARY OF INVENTION

The inventors of the present invention have discovered that the use of excessive amounts of residual dispersion, especially at the edge channels of a given band, improves the NRZ-performance of a long-haul WDM system by reducing the severity of non-linear penalties. Accordingly, in accordance with one aspect of the present invention, there is provided a method for compensating for dispersion in an NRZ modulated WDM optical communication system that includes a transmitter, a receiver and an optical fiber transmission path coupling the transmitter to the receiver. The method comprises providing a predetermined excessive amount of residual dispersion to the edge channels of a WDM signal; whereby the predetermined excessive amount of residual dispersion reduces nonlinear distortions experienced by the NRZ pulses.

Preferably, the method includes providing a predetermined amount of pre-compensation dispersion and a predetermined amount of post-compensation dispersion. More preferably, the split ratio between the pre-compensation dispersion and the post-compensation dispersion for channels shorter than the zero dispersion wavelength is 40%/60%. For channels on the other side of the zero dispersion wavelength, the split ratio is 60%/40%. More preferably, the method includes a predetermined excessive amount of residual dispersion at between about 500 ps/nm and 2000 ps/nm. This value depends on the length of the system and wavelength, or more precisely the degree of nonlinearities experienced by a given channel in the transmission. In other words, the ultimate amount of residual dispersion used depends upon the amount of accumulated dispersion.

In another aspect of the present invention, there is provided a WDM optical communication system. This system includes a transmitter and a receiver; an optical fiber transmission path coupling the transmitter to the receiver. The transmission path includes at least one optical amplifier. Also included is a dispersion compensation unit (DCU) disposed between the transmitter and said optical fiber transmission path for performing pre-compensation and a DCU disposed between the optical fiber transmission path and said receiver for performing post-compensation. In this aspect, the pre/post DCU split ratio is 40%/60% for those wavelengths shorter than the zero dispersion wavelength and 60%/40% for those wavelengths longer than the zero dispersion wavelength. There is also included a predetermined amount of residual dispersion is applied to the edge channels of the band of the WDM optical communication system to reduce the nonlinearities associated with NRZ modulated signals. Preferably, the predetermined amount of residual dispersion is between about 500 ps/nm and 2000 ps/nm.

Additional features and advantages of the invention will be set forth in the description, which follows. It is to be understood that both the foregoing general description and the following detailed description are exemplary and are intended to provide further explanation of the invention as claimed.

In the drawings, like reference characters denote similar elements throughout the several views. Various elements of the drawings are in certain instances not drawn to scale, but instead are sometimes purposely distorted for the purposes of illustrating the invention.

DETAILED DESCRIPTION

Reference will now be made in detail to the preferred embodiment of the present invention, an example of which is illustrated in the accompanying drawings.

Figure 1:
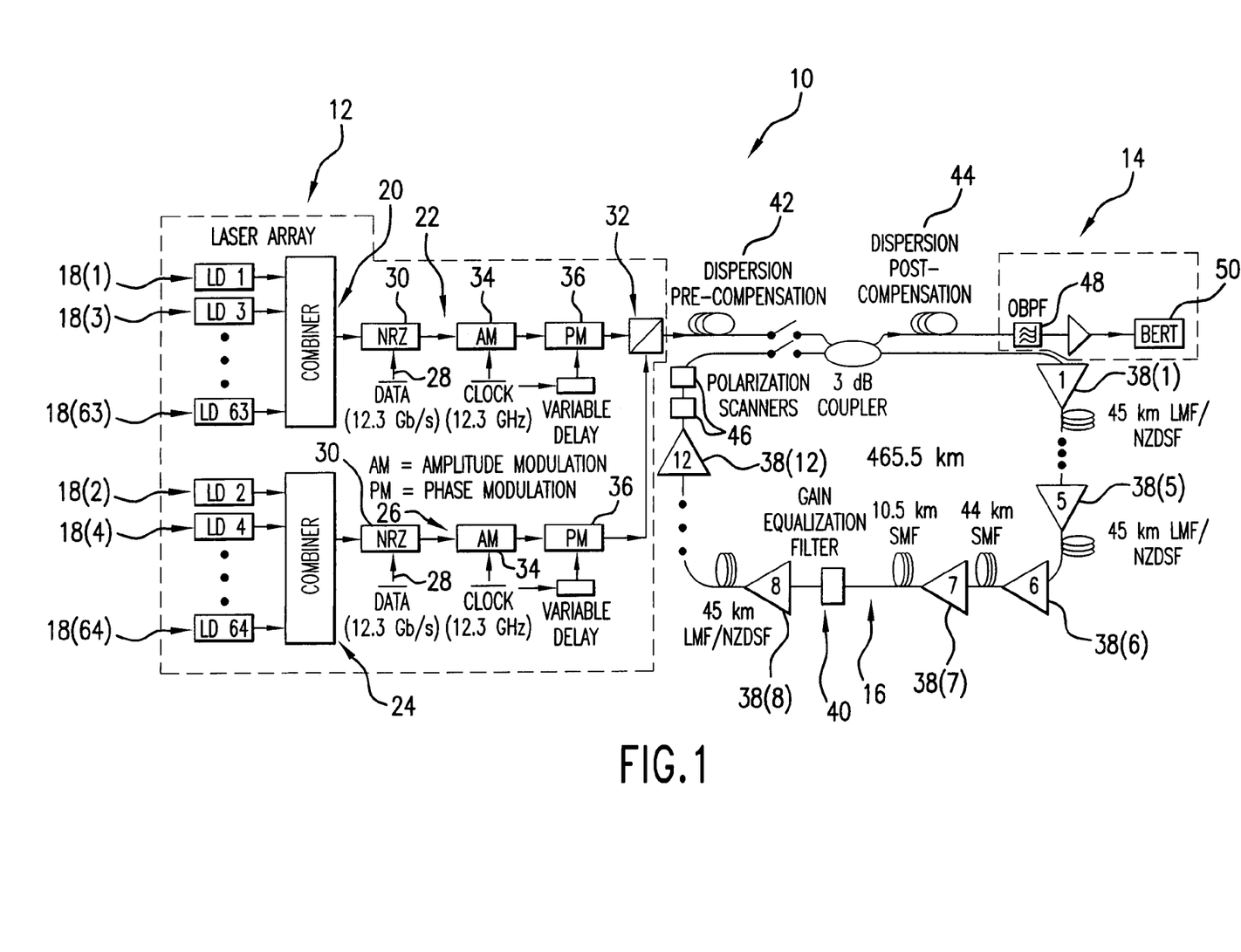
FIG. 1 is a simplified block diagram of a loop experimental setup that emulates a long-haul WDM optical fiber transmission system in accordance with one embodiment of the present invention.

An exemplary embodiment of an optical fiber transmission system of the present invention is shown in FIG. 1, designated generally by reference numeral 10. The transmission system 10 includes a transmitter portion 12, a receiver portion 14 and an optical fiber transmission path 16.

The system 10 is a simulation of an actual 9000 km transmission system, known as a loop transmission experimental set-up. Within the fiber optic research society, loop experiments are a conventional way of simulating actual transmission systems. It is to be understood by one of ordinary skill in the art that any long-haul NRZ-based WDM optical transmission system is contemplated by, and within the scope of, the present invention.

Referring to FIG. 1, the transmitter 12 includes 64 continuous wave (CW) lasers designated 18(1) to 18(64). In this exemplary set-up, channels on which data will be transmitted range in wavelengths between about 1537.4 nm and 1562.6 nm but may be any range within a usable optical band. The channel spacing in this preferred embodiment is about 0.4 nm but may be any acceptable channel spacing used in an optical system. For convenience and clarity, only certain of the 64 CW lasers are shown in FIG. 1. However, it is to be understood that all 64 channels are present. Again, the number of channels can vary depending on the amount of information being carried.

In this particular embodiment, the odd numbered CW lasers, i.e., 18(1), 18(3) . . . 18(63), are combined into a first combiner 20 and then onto a first optical path 22. The even numbered CW lasers, i.e., 18(2), 18(4) . . . 18(64) are combined into a second combiner 24 and onto a second optical path 26.

The 64 CW lasers, i.e., 18(1)-18(64) are then modulated by data 28, using NRZ format modulation unit 30. The 64 channels are then combined pair-wise orthogonal in a polarization-dependent beam combiner 32.

The modulation includes NRZ coding at 12.3 Gb/s. When so desired, the NRZ signal may be re-modulated with a sinusoidally-driven amplitude modulator 34 to form 35 ps-wide RZ pulses, which in turn can be formed to CRZ using a phase modulator 36. The optical fiber transmission path 16 is about a 465.5 km loop used to simulate 9000 km of fiber. The average zero dispersion wavelength and dispersion slope of the entire span 16 is about 1549.05 nm and 0.058 ps/km/nm$^2$, respectively. The span 16 contains 12 erbium doped fiber amplifiers (EDFAs) 38(1) to 38(12) with a usable bandwidth of about 28 nm.

The gain equalization of the amplifier chain is fine-tuned using a Mach-Zehnder type gain equalization filter 40. The 38(1) to 38(12) EDFAs have an average noise figure of about 4.1 dB and a total output power of about 13 dBm, or about 310 µW per channel. The example set-up also allows for an individual optimization of the pre-dispersion 42 and post-dispersion 44 compensation for each channel. To achieve a system performance, which is a long-term representative regarding polarization effects such as polarization dependent loss (PDL) and polarization mode dispersion (PMD), the loop includes polarization scanners 46.

At the receiver 14, the channels are demultiplexed using, for example, an optical band pass filter 48 with a full width at half maximum (FWHM) bandwidth of about 0.22 nm. The bit error rate (BER), which measures the performance criterion for digital receivers is then measured using an error counter, known as BER Testset (BERT) 50. Then, the Q-factor is calculated. The BER is defined as the probability of incorrect identification of a bit by the decision circuit of the receiver. The Q-factor is the argument to the normal error function for the purpose of calculating the BER.

As an exemplary transmission set-up in accordance with an embodiment of the present invention, referring to FIG. 1, the transmission system 10 is set to run as a transpacific 64 channel×12.3 Gb/s WDM system with fairly strong nonlinearities for the edge channels of the band. As discussed, it is at these edge channels that a large amount of dispersion accumulates along the transmission line. For these channels, the inventors have discovered that use of an excessive amount of residual dispersion significantly improves the NRZ-performance of the system.

A preferred embodiment, which yields increased performance of the NRZ-based format, requires between 500 ps/nm and 2000 ps/nm depending upon the dispersion and length of the system. This particular example long-haul system requires as much as 1300 ps/nm of residual dispersion.

Figure 1A:
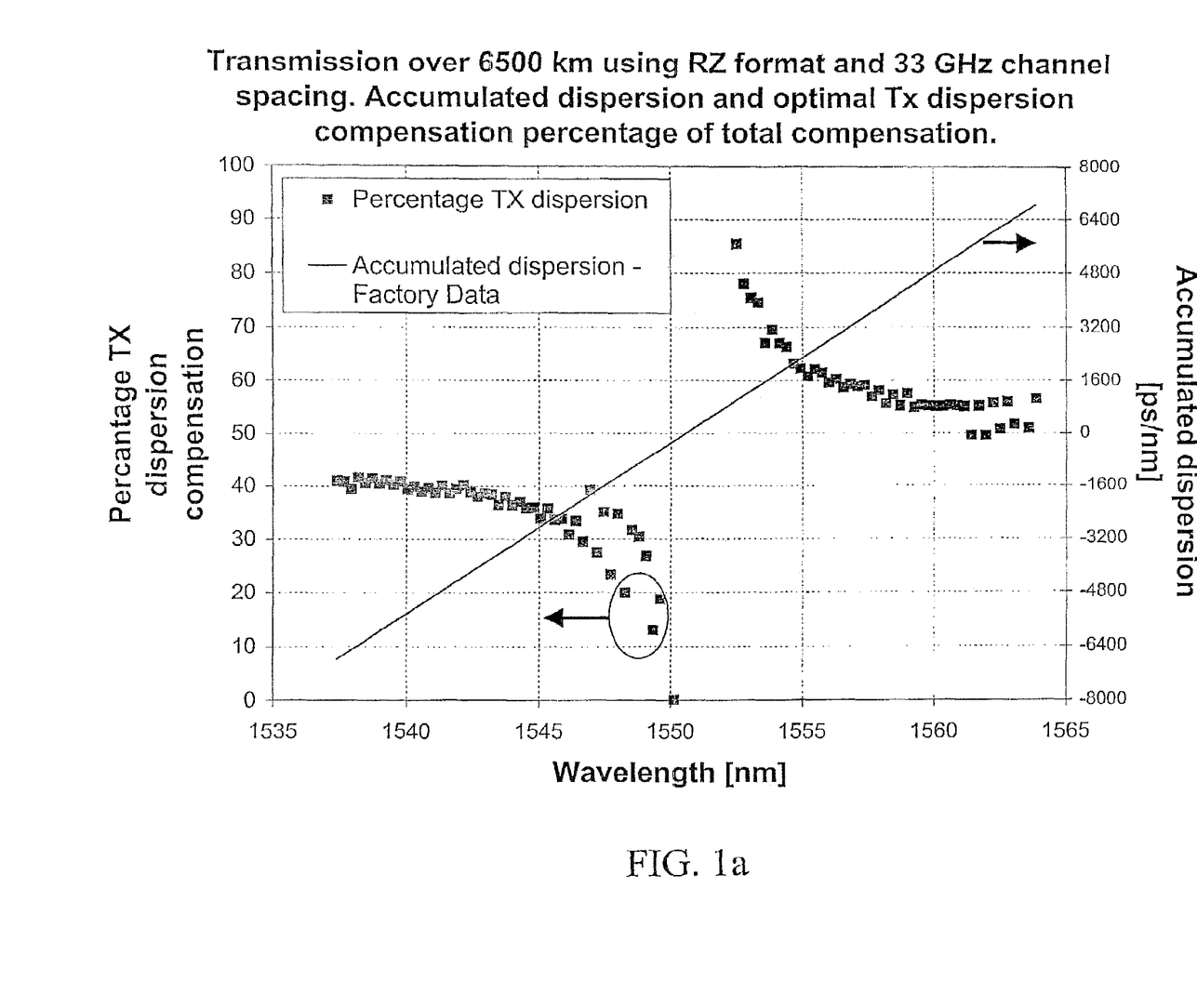
FIG. 1a is a graph showing optimal transmission dispersion compensation as a percentage of total compensation.

For those channels having wavelengths shorter than the zero dispersion wavelength the ideal split ratio is 40%/60% pre/post DCU. For those channels having wavelengths longer than the zero dispersion wavelength, the ideal split ratio is 60%/40%. An example of such ratios and their effect on overall performance of a long-haul optical communication system is illustrated in FIG. 1a. Although this Figure illustrates optimum split ratios in an RZ-based WDM system, it applies to an NRZ-based system as described herein, with respect to pre-dispersion compensation and post-dispersion compensation.

For comparison, an ideal CRZ performance for the same channels is obtained with less than 200-ps/nm residual dispersion and the performance is much less sensitive to the DCU split-ratio.

It has been discovered that the excessive amount of residual dispersion counteracts the nonlinear distortion experience along the transmission by the NRZ pulses and helps to reshape the pulses to what gives better performance. The 40%/60% (or 60%/40% depending on the channel wavelength) pre/post DCU split ratio result in an input pulse shape that experiences the least possible amount of nonlinear distortions along the transmission line 16.

These dispersion compensation rules in operation provide the advantage of reducing the nonlinear propagation effects in NRZ-based WDM systems. This allows for a higher optical power per channel and/or longer transmission distances, combined with the high degree of spectral efficiency that the NRZ format inherently provides.

During propagation, channels with large accumulated dispersion experience the largest pulse width changes and thus the strongest overlap with bits from other channels. These channels suffer most from nonlinear inter-symbol interference (ISI). In the dispersion map configuration used for the preferred embodiment of the present invention, the edge channels accumulate considerably more dispersion than the center channels. To exemplify channels with different accumulated dispersion, channel 2 (1537.8 nm) and channel 34 (1550.6 nm) have been chosen. These two channels have accumulated dispersion of −5900 and 770 ps/nm, respectively, at 9000 km.

To more clearly identify the advantage of using excessive amounts of residual dispersion in an NRZ-based system verses CRZ or RZ-base systems, comparison of the performance of CRZ, RZ and NRZ modulation formats has been made. Q-factor is measured versus distance for channels 2 and 34 with CRZ, RZ and NRZ modulation formats. For each measurement, pre-dispersion and post-dispersion compensation were carefully optimized.

Figure 2:
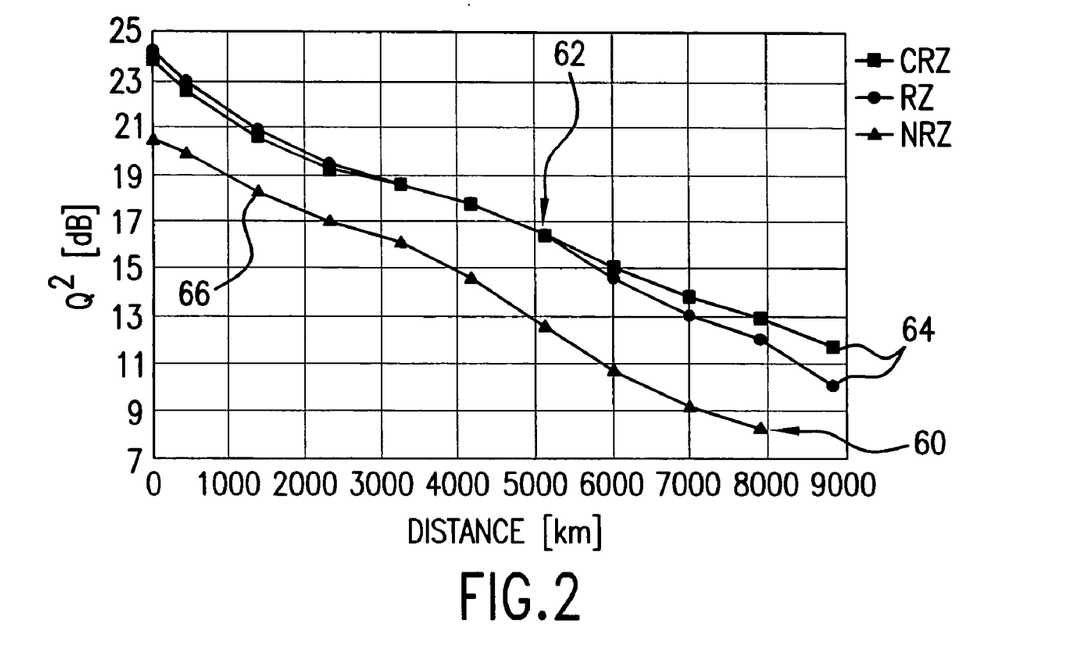
FIG. 2 is a graph showing the Q-factor versus distance for a sample channel 2 with different modulation formats as tested using the system of FIG. 1.

FIG. 2 shows Q-factor versus distance for channel 2 with different modulation formats. For NRZ at, for example, 7900 km, point 60, the maximum available pre-dispersion and post-dispersion compensation are used, thus preventing propagation of this format any further. As shown in FIG. 2, CRZ and RZ exhibit very similar performance at distances up to about 5000 km, point 62. However, as the distance and width of the accumulated dispersion and nonlinear ISI start to increase, CRZ eventually becomes superior to RZ, resulting in about a 1.5 dB higher Q-factor at 8850 km, point 64.

The NRZ results consistently fall with respect to RZ and CRZ, and the impairment increases rapidly as the distance and the accumulated dispersion increases. This indicates that NRZ is most susceptible to nonlinearities. At 1400 km, point 66, the NRZ Q-factor is 2.4 dB lower than the Q-factor of CRZ, whereas the difference increases to as much as about 4.6 dB at 7900 km, point 60.

At short distances, the superior performance of RZ and CRZ compared to NRZ is mainly due to a larger optical eye opening, which is beneficial for the receiver 14 for the same average power. RZ and CRZ benefit from a larger pulse peak power and eye opening. However, at large distances, the system is also deteriorated by the nonlinear ISI due to the large accumulated dispersion for channel 2, which clearly degrades the NRZ performance much more drastically than that of CRZ and RZ.

Figure 3:
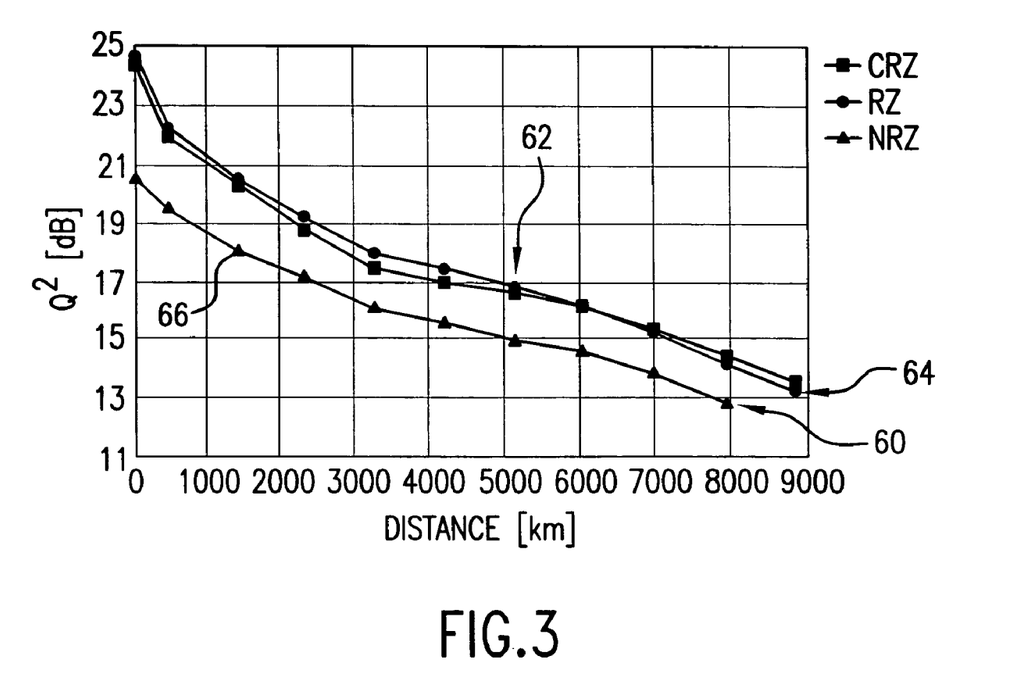
FIG. 3 is a graph showing the Q-factor versus distance for a sample channel 34 with different modulation formats as tested using the system of FIG. 1.

This conclusion is also confirmed by studying FIG. 3 showing Q-factor versus distance for channel 34, which acquires much less accumulated dispersion. Here, the performance of all three formats is predominantly limited by linear effects such as SNR and linear cross-talk, thus resulting in a fairly constant difference for the different modulation formats along the propagation path, as seen in FIG. 3.

Figure 4:
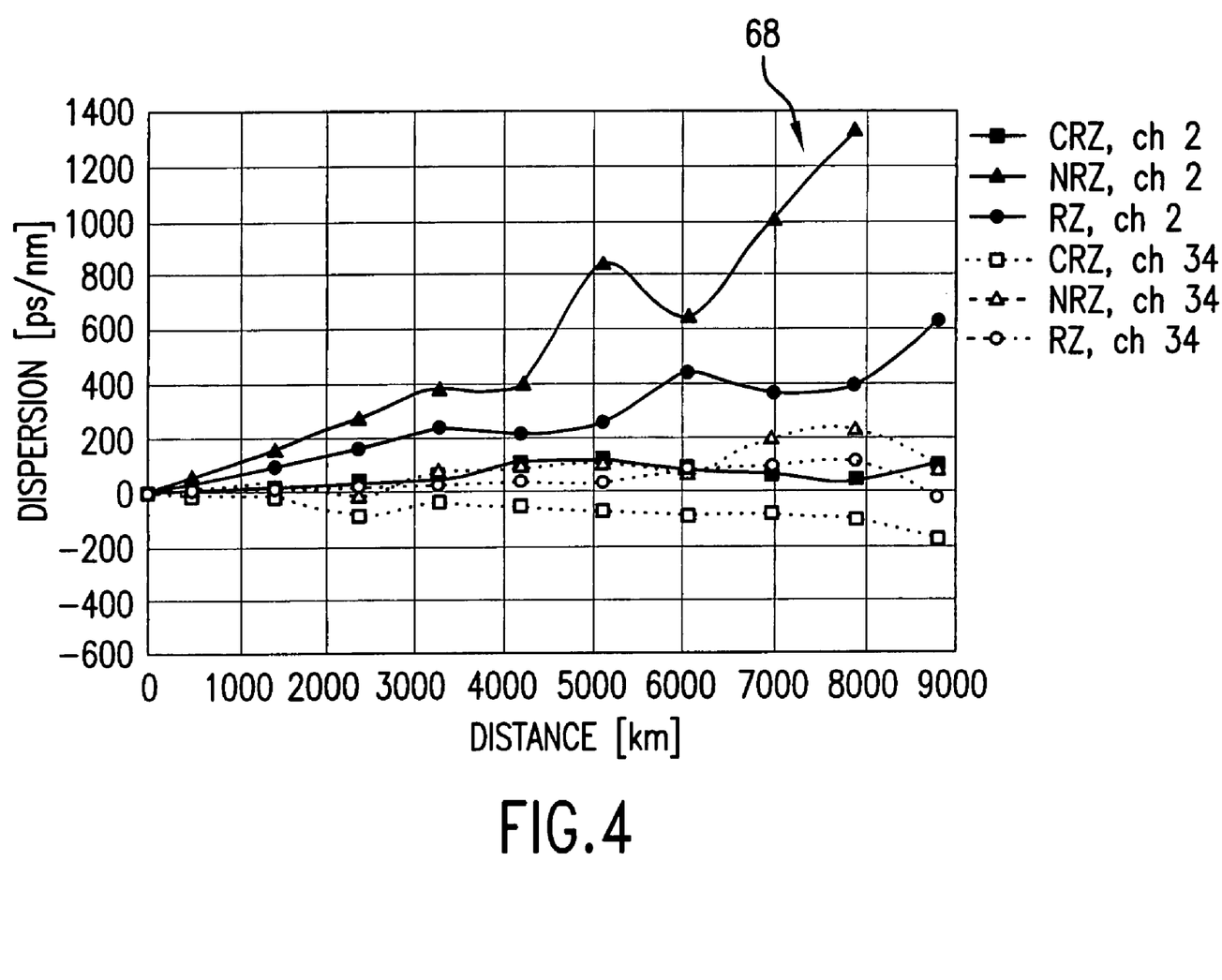
FIG. 4 is a graph showing the optimum residual dispersion versus distance for sample channels 2 and 34 with different modulation formats as tested using the system of FIG. 1.
Figure 5:
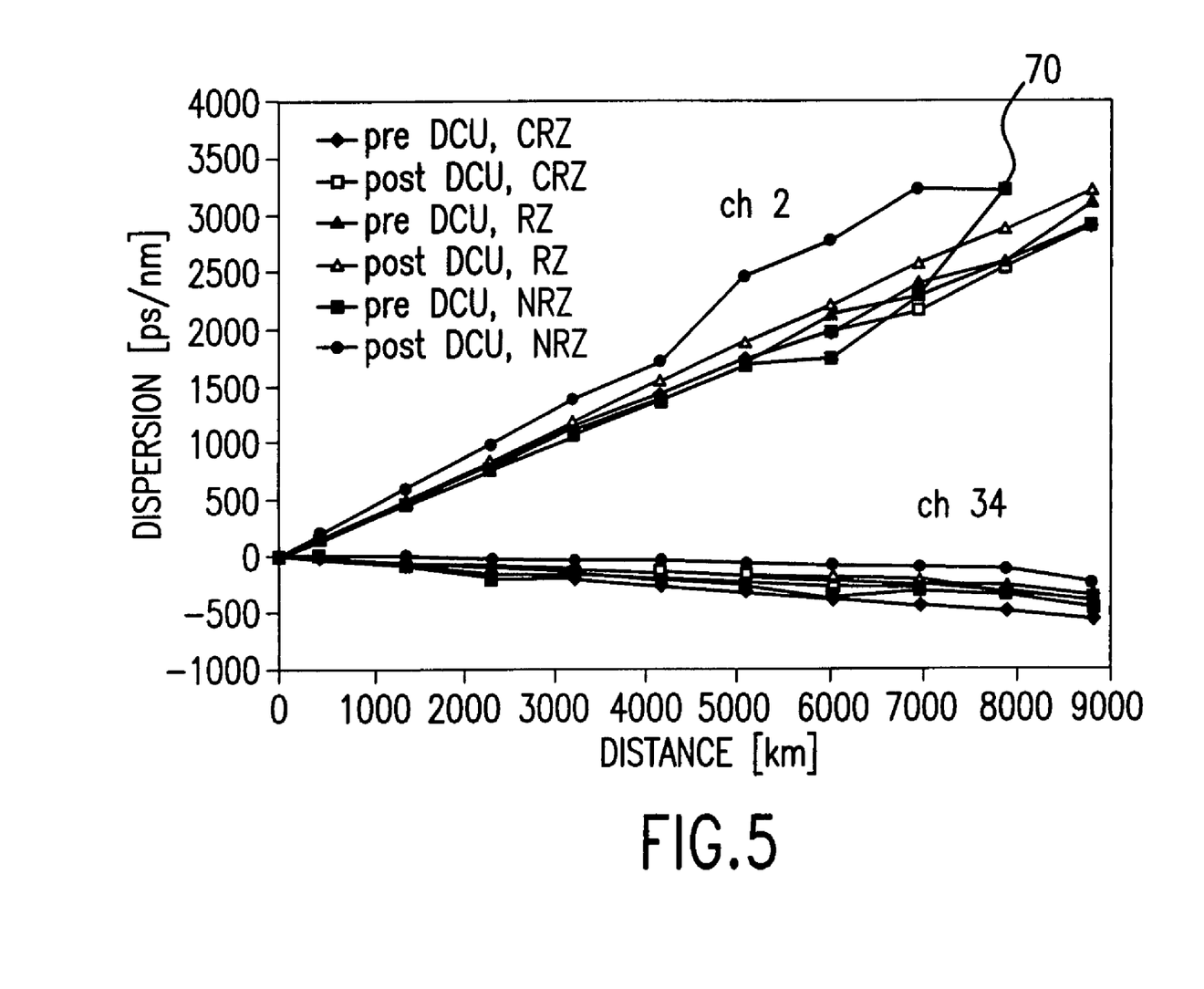
FIG. 5 is a graph showing the optimum pre-dispersion and post-dispersion compensation versus distance for sample channels 2 and 34 with different modulation formats as tested using the system of FIG. 1.

FIGS. 4 and 5 show the optimum residual dispersion and the corresponding pre-dispersion and post-dispersion compensation for channels 2 and 34 with different modulation formats. Noteworthy in FIG. 4 is the large residual dispersion required for substantially better NRZ performance for channel 2 at long distances, point 68. This indicates the nonlinear behavior of this case because the optimum residual dispersion in a strictly linear system is zero. Contrary to the other cases, the dispersion compensation split-ratio becomes increasingly crucial for channel 2 with NRZ format as the distance increased.

Here, the substantially better performance consistently requires more post-compensation than pre-compensation, as shown in FIG. 5, point 70. At 7900 km, the maximum available pre-compensation and post-compensation are used. Moreover, a 40%/60% DCU split ratio is found to be ideal for these channels. This is another indication of the strongly nonlinear nature of this case as the DCU split-ratio is not as critical in a strictly linear system.

As compared to today's NRZ-based WDM systems, which are operated in the linear regime with a very small residual dispersion and a non-crucial DCU split ratio, the present inventors discovered a novel dispersion compensation technique to improve nonlinear NRZ-based WDM transmission. The present invention allows for a higher optical power per channel and/or longer transmission distances for NRZ-based systems.

Thus, the present invention has many advantages over the prior art. One such advantage is the reduction of nonlinearities in an NRZ-format WDM optical transmission system. In a preferred embodiment, the system uses an excessive amount of residual dispersion and either a 40%/60% DCU split ratio or a 60%/40% DCU split ratio to optimize the performance of these types of systems, where nonlinear propagation effects are not negligible.

It will be apparent to those skilled in the art that various modifications and variations can be made in the method and apparatus of the present invention without departing from the spirit or scope of the invention. Thus, it is intended that the present invention covers the modifications and variations of this invention provided they come within the scope of the appended claims and their equivalents.

What is claimed is:

1. A method for compensating for dispersion in an NRZ-based WDM optical communication system that includes a transmitter, a receiver and an optical fiber transmission path coupling said transmitter to said receiver; said method comprising:

providing a first predetermined amount of pre-compensation dispersion between said transmitter and said optical fiber transmission path for wavelengths shorter than a zero dispersion wavelength and a second predetermined amount of pre-compensation dispersion between said transmitter and said optical fiber transmission path for wavelengths longer than said zero dispersion wavelength and a first predetermined amount of post-compensation dispersion between said optical fiber transmission path and said receiver for said wavelengths shorter than said zero dispersion wavelength and a second predetermined amount of post-compensation dispersion between said optical fiber transmission path and said receiver for said wavelengths longer than said zero dispersion wavelength, said first predetermined amount of pre-compensation dispersion being less than said first predetermined amount of post compensation dispersion and said second predetermined amount of pre-compensation dispersion being greater than said second predetermined amount of post compensation dispersion; and allowing accumulation of a non-zero residual dispersion to edge channels of said WDM signal;

whereby said non-zero residual dispersion reduces nonlinear distortions experienced by said NRZ pulses.

2. The method of claim 1 wherein the ratio split between said first predetermined amount of pre-compensation dispersion and said first predetermined amount of post-compensation dispersion is 40%/60% for at least one channel having a wavelength shorter than the zero dispersion wavelength.

3. The method of claim 1 wherein said non-zero residual dispersion is between 500 ps/nm and 2000 ps/nm.

4. A WDM optical communication system, comprising:
a. a transmitter and a receiver;
b. an optical fiber transmission path coupling said transmitter to said receiver, said transmission path including at least one optical amplifier;
c. a dispersion compensation unit (DCU) disposed between said transmitter and said optical fiber transmission path for performing pre-compensation;
d. a DCU disposed between said optical fiber transmission path and said receiver for performing post-compensation; and wherein said pre-compensation is less than said post compensation for channels having wavelengths shorter than a zero dispersion wavelength and said pre-compensation is greater than said post compensation for channels having wavelengths longer than said zero dispersion wavelength, and wherein a non-zero residual dispersion is applied to edge channels of band of said WDM optical communication system to reduce the nonlinearities associated with NRZ modulated signals.

5. The WDM optical communication system of claim 4 wherein said pre/post DCU split ratio is 40%/60% for at least one channel having a wavelength shorter than the zero dispersion wavelength.

6. The WDM optical communication system of claim 4 wherein said non-zero residual dispersion is between 500 ps/nm and 2000 ps/nm.

7. The WDM optical communication system of claim 4 wherein said non-zero residual dispersion is between 1000 ps/nm and 1500 ps/nm.

8. A method for compensating for dispersion in an NRZ-based WDM optical communication system that includes a transmitter, a receiver and an optical fiber transmission path coupling said transmitter to said receiver; said method comprising:

providing a first predetermined amount of pre-compensation dispersion between said transmitter and said optical fiber transmission path for wavelengths shorter than a zero dispersion wavelength and a second predetermined amount of pre-compensation dispersion between said transmitter and said optical fiber transmission path for wavelengths longer than said zero dispersion wavelength and a first predetermined amount of post-compensation dispersion between said optical fiber transmission path and said receiver for said wavelengths shorter than said zero dispersion wavelength and a second predetermined amount of post-compensation dispersion between said optical fiber transmission path and said receiver for said wavelengths longer than said zero dispersion wavelength, said first and second predetermined amounts of pre-compensation dispersion and first and second predetermined amounts of said post-compensation dispersion being configured to allow accumulation of a non-zero residual dispersion to edge channels of said WDM signal, said first predetermined amount of pre-compensation dispersion being less than said first predetermined amount of post compensation dispersion for ones of said edge channels having a wavelength shorter than said zero dispersion wavelength, and said second predetermined amount of pre-compensation dispersion being greater than said second predetermined amount of post compensation dispersion for ones of said edge channels having a wavelength shorter than said zero dispersion wavelength.

9. The method of claim 8 wherein the ratio between said first predetermined amount of pre-compensation dispersion and said first predetermined amount of post-compensation dispersion is 40%/60% for at least one of said ones of said edge channels having a wavelength shorter than the zero dispersion wavelength.

10. The method of claim 8 wherein said non-zero residual dispersion is between 500 ps/nm and 2000 ps/nm.

* * * * *